United States Patent Office 3,758,486
Patented Sept. 11, 1973

3,758,486
RARE EARTH NIOBATE COMPOSITION
Richard C. Ropp, Warren, N.J., assignor to Westinghouse Electric Corporation, Pittsburgh, Pa.
No Drawing. Filed May 13, 1969, Ser. No. 824,300
Int. Cl. C09k 1/46
U.S. Cl. 252—301.4 R         6 Claims

ABSTRACT OF THE DISCLOSURE

Luminescent compositions of the system comprising yttrium, lanthanum, gadolinium, or combinations thereof, niobate activated by selected rare earth metals are specified. The orthoniobate is the preferred composition and is provided by utilizing a 1:1 gram atom ratio of yttrium, lanthanum, and gadolinium to niobium. Luminescent compositions of the system are all excited by ultraviolet radiation with the emission characteristic depending upon the particular selected rare earth metal activator.

BACKGROUND OF THE INVENTION

The composition yttrium, gadolinium orthoniobate is known in the art, and is known to be a luminescent material without further activation. The formation of other rare earth metals niobate systems is taught by A. J. Dyer and E. A. B. White, Transactions of the British Ceramic Society, vol. 63, p. 301, 1964.

SUMMARY OF THE INVENTION

An object of the present invention is to provide novel ultraviolet responsive luminescent materials particularly for use with mercury discharge devices.

The ultraviolet responsive luminescent materials consist essentially of $Ln_aNb_cO_d:X_e$, wherein Ln is one or more of yttrium, lanthanum, and gadolinium, wherein X is one or more of praseodymium, samarium, europium, terbium, dysprosium, erbium, holmium, and thulium, and when Ln is yttrium and/or lanthanum X also includes gadolinium. The value of $e$ can be varied from 0.005 to about 0.45 with a value of $a+e$ of about 0.3 to 1.6, $c$ is about 1, and $d$ is 3, 4, or 7 depending on the particular niobate compound of this system desired. The particular composition of the niobate system is provided or determined by providing a raw mix ratio of the reacting constituents of rare earth metal compounds to niobium compound where the gram atom ratio of rare earth metal to niobium can be 3:1, 1:1, 1:3. The preferred species is the orthoniobate wherein a ratio of 1:1 is provided in the raw mix, and $d$ is 4 in the composition produced.

DESCRIPTION OF THE PREFERRED EMBODIMENTS

The various compositions of the niobate system can be prepared by simply firing mixtures of the rare earth metal oxides and niobium pentoxide. As a specific example the raw mix of about 225.8 grams of $Y_2O_3$, 18.6 grams of $Dy_2O_3$, and about 265.8 grams of $Nb_2O_5$ are thoroughly mixed together and fired for about 6 hours at about 1350° C. in an oxygen containing atmosphere, which is preferably air.

The preferred composition of the system $LnNbO_4:X$ is thus readily provided by providing a gram atom ratio of 1:1 of rare earth metal to niobium in the raw mix. When the gram atom ratio of rare earth metal to niobium is 3:1 in the raw mix the niobium compound $Ln_3NbO_7:X$ is formed. The niobate composition $Ln(NbO_3)_3$ has also been observed when the raw mix contains a gram atom ratio of rare earth metal to niobium of 1:3. These compositions have been identified by X-ray diffraction pattern analysis.

In preparing the rare earth metal niobate compositions of the system of the present invention the yttrium, lanthanum, and gadolinium can be freely substituted for each other in the raw mix, except when gadolinium activation is desired, and then gadolinium will only activate a yttrium and/or lanthanum niobate. The selected rare earth metals used for activation can be substituted in whole or in part for the dysprosium in the above example in amounts to provide a value of $e$ of from about 0.005 to about 0.45. It has been determined that there are preferred ranges for inclusion of various rare earth metal activators. Thus, for thulium, erbium, and holmium, the preferred range of activators provides a value of $e$ of from 0.0005 to 0.005. The preferred range for samarium, and dysprosium provides the value of $e$ from 0.001 to 0.1. The preferred range for europium and terbium provides the value of $e$ of from 0.01 to 0.2. The preferred activating proportion when X is gadolinium provides a value of $e$ of about 0.05 to 0.45.

The compositions of the niobate systems described are all excited by 254 nanometer ultraviolet excitation, and emit characteristically in a particular portion of the visible spectrum for the particular rare earth metal activator utilized. Thus for example, the dysprosium activated yttrium orthoniobate which is prepared as described above emits at about 575 nanometers. It has also been discovered that a portion of the emitted energy for this composition is in a blueband at about 410 nanometers which energy is attributed to the emission from the yttrium niobate matrix constituent. An interesting composition of this system is lanthanum and/or yttrium orthoniobate activated by gadolinium in an amount which provides the value of $e$ of about 0.05 to 0.1. This composition is an ultraviolet emitter upon excitation by 254 nanometer radiation, with the peak emission at about 310 nanometers.

It has been found desirable to refire the niobate compositions as initially prepared, and particularly to include alkaline earth metal chloride fluxes, such as calcium fluoride and strontium fluoride in amounts of about 10 weight percent, with the niobate compounds and refiring to improve the brightness. A typical refiring procedure would be carried out at about 1150° C. for about 4 hours.

It will be apparent to those skilled in the art that the compositions of the niobate system described can be prepared by using obvious modifications of the method of preparation, such as utilizing rare earth metal oxalates in the raw mix. The firing conditions can be widely varied at from about 1000° C. to about 1500° C. for a sufficient time to provide activation. Some variation of the preferred firing temperatures and times have been observed for various activators, and as an example 1350° C. for about 6 hours is preferred for dysprosium activation, while a firing at about 1100° C. for about 8 hours is preferred for europium activation. The niobium constituent is preferably supplied to the raw mix as niobium pentoxide but other niobium compounds which are readily decomposable to the oxide can be utilized.

The inclusion of the various activators produce niobate compositions which emit principally as line emitters in the characteristic portion of the visible spectrum, for example samarium activation provides a bright orange emitting, phosphor, dysprosium activation a bright yellow phosphor, europium activation a bright red phosphor, and the terbium, holmium, and erbium phosphors are bright green emitters.

It has been thus shown that the self emissive orthoniobates of lanthanum, gadolinium, and yttrium can be activated by other selected rare earth metals to provide very bright phosphors which emit in the visible portion of the spectrum.

I claim:
1. The luminescent compositions of the niobate system consisting essentially of $Ln_aNb_cO_d:X_e$, wherein Ln is one or more of yttrium, lanthanum, and gadolinium, wherein X is selected from one or more of praseodymium, samarium, europium, terbium, dysprosium, erbium, holmium, and thulium, when Ln is yttrium and/or lanthanum X includes gadolinium, and wherein $e$ is from about 0.0005 to about 0.45, $a+e$ is from about 0.3 to 1.6, $c$ is 1, and $d$ is 3, 4, or 7 depending on the particular niobate composition of the niobate system.

2. The composition specified in claim 1, wherein $d$ is 4 which corresponds to an orthoniobate.

3. The composition as specified in claim 1, wherein X is europium or terbium, and $e$ is from 0.01 to 0.2.

4. The composition as specified in claim 1, wherein X is gadolinium, and $e$ is about 0.05 to 0.45.

5. The composition as specified in claim 1, wherein X is samarium or dysprosium, and $e$ is from 0.001 to 0.1.

6. The composition as specified in claim 1, whereon X is thulium, erbium, or holmium, and $e$ is from 0.0005 to 0.005.

References Cited
UNITED STATES PATENTS

| | | | |
|---|---|---|---|
| 3,250,722 | 5/1966 | Borchardt | 252—301.4 R |
| 3,289,100 | 11/1966 | Ballman et al. | 252—301.4 R |
| 3,294,701 | 12/1966 | Vogel et al. | 252—301.4 R |

OSCAR R. VERTIZ, Primary Examiner

J. COOPER, Assistant Examiner